US008269444B2

United States Patent
Tseng et al.

(10) Patent No.: US 8,269,444 B2
(45) Date of Patent: Sep. 18, 2012

(54) SYSTEM AND METHOD FOR CONTROLLING SENSORLESS MOTOR

(75) Inventors: Chien-Chung Tseng, Hsinchu County (TW); Hsien-Wen Hsu, Hsinchu County (TW); Chien-Jen Hsieh, Hsinchu County (TW)

(73) Assignee: inergy Technology Inc., Hsinchu County (TW)

( * ) Notice: Subject to any disclaimer, the term of this patent is extended or adjusted under 35 U.S.C. 154(b) by 303 days.

(21) Appl. No.: 12/755,414

(22) Filed: Apr. 6, 2010

(65) Prior Publication Data

US 2011/0241588 A1 Oct. 6, 2011

(51) Int. Cl.
*H02P 6/00* (2006.01)
*H02P 6/18* (2006.01)

(52) U.S. Cl. .............................. 318/400.35; 318/400.34

(58) Field of Classification Search ............. 318/400.34, 318/400.35

See application file for complete search history.

(56) References Cited

U.S. PATENT DOCUMENTS

| | | | | |
|---|---|---|---|---|
| 5,422,570 A * | 6/1995 | Moreira | ......................... | 324/177 |
| 5,481,166 A * | 1/1996 | Moreira | ................... | 318/400.04 |
| 6,979,970 B2* | 12/2005 | Iwanaga et al. | ........... | 318/400.35 |
| 7,106,013 B2* | 9/2006 | Narumi et al. | ........... | 318/400.25 |
| 7,235,939 B2* | 6/2007 | Viti | ......................... | 318/400.35 |
| 8,093,847 B2* | 1/2012 | Otaguro | ................... | 318/400.35 |
| 2006/0028161 A1* | 2/2006 | Yamamoto et al. | ........... | 318/432 |
| 2009/0218974 A1* | 9/2009 | Paintz | ....................... | 318/400.35 |

* cited by examiner

*Primary Examiner* — Thomas Dougherty
(74) *Attorney, Agent, or Firm* — CKC & Partners Co., Ltd.

(57) ABSTRACT

A system and a method for controlling a sensorless motor are disclosed, where the system includes a motor driver and a zero-crossing detector. The motor driver can drive the sensorless motor. The zero-crossing detector can detect a zero-crossing point when the voltage of one motor coil of the sensorless motor is in a blanking period.

10 Claims, 7 Drawing Sheets

US 8,269,444 B2

SYSTEM AND METHOD FOR CONTROLLING SENSORLESS MOTOR

BACKGROUND

1. Field of Invention

The present invention relates to an electronic device and a control method, and more particularly, the present invention relates to an electronic device and a method for controlling sensorless motor.

2. Description of Related Art

In recent years, because of the development of industry and commerce, and the advance of society, the products provided accordingly are designed for the purposes of convenience, usefulness, and cheapness. Therefore, products developed presently are more progressive than those developed previously, and the social contribution is made accordingly. In terms of motors, in recent years, motor manufacturers developed more convenient sensorless motors. Sensorless motors double the performance with half the effort.

In the field of controlling of the sensorless motor, it is a very important technical detail to determine a time point for phase-change. However, when the process for determining the time point for phase-change is performed, the time point is often erroneously determined because of the interference of various electronic devices. If the phase of the sensorless motor is changed at an incorrect time point, either unsmooth operation or demagnetization leading to permanent errors are raised.

In view of the foregoing, in obviousness, the products developed presently still have inconvenience and shortages, and need to be further improved. For solving the problem of erroneous determination of the time point for phase-change, people in the related field devote themselves to resolving the problem, but no adaptive method has been developed in a long time. Therefore, how to determine the time point for phase-change more precisely is an important subject at present, and it also becomes a target needed to be improved.

SUMMARY

An aspect of the present invention is to provide a system and a method for controlling a sensorless motor to exactly detect a zero-crossing point, so as to determine a time point for phase-change.

According to an embodiment of the present invention, the system for controlling a sensorless motor comprises a motor driver and a zero crossing is detector. The sensorless motor comprises at least three motor coils connected to a neutral point. The motor driver is used to drive the sensorless motor to enable the voltage of each of the motor coils to enter a blanking period, when the value of the voltage of each of the motor coils is changed from negative to positive or from positive to negative. The zero crossing detector is used to detect a zero-crossing point for the sensorless motor at the time when the voltage of one of the motor coils enters the blanking period.

Accordingly, when the system is used, the purpose for setting up a blanking period in the process for driving the sensorless motor is to enable the motor coils to reserve a noiseless voltage, so as to help the detection of the zero-crossing point.

According to another embodiment of the present invention, the method for controlling the sensorless motor comprises following steps. At first, the sensorless motor is driven to enable the voltage of each of the motor coils to enter a blanking period, when the value of the voltage of each of the motor coils is changed from negative to positive or from positive to negative. Then, the zero-crossing point is detected for the sensorless motor at the time point when the voltage of one of the motor coils enters the blanking period.

Accordingly, when the method is used, the purpose for setting up a blanking period is to enable the motor coils to reserve a noiseless voltage, so as to help the detection of the zero-crossing point in the process for driving the sensorless motor.

According to further another embodiment of the present invention, a system for controlling a sensorless motor comprises a motor driver and a zero crossing detector, wherein the zero crossing detector comprises a sensor and a detector. The sensorless motor comprises at least three motor coils connected to a neutral point, and at least three driving transistor groups respectively connected to the motor coils. The motor driver is used to generate a pulse-width modulation signal for each of the driving transistor groups selected, so as to enable the sensorless motor to work in accordance with the pulse-width modulation signal, wherein the pulse-width modulation signal comprises a plurality of pulses having spaces there between. The sensor is used to detect an internal parasitic effect of inductor and capacitor (internal L-C effect) of the sensorless motor. The detector is used to detect a zero-crossing point through the motor coils in a period when each of the driving transistor groups receives the pulses of the pulse-width modulation signal, but after the internal parasitic effect of inductor and capacitor ends.

Accordingly, when the system is used, the zero-crossing point is detected after the interferences caused by the internal L-C effect disappear, so as to avoid the erroneous determination of the zero-crossing point and increase the precision of the determination of the zero-crossing point.

According to another embodiment of the present invention, a method for controlling the sensorless motor comprises following steps. At first, a pulse-width modulation signal is generated for each of the driving transistor to groups selected, so as to enable the sensorless motor to work in accordance with the pulse-width modulation signal, wherein the pulse-width modulation signal comprises a plurality of pulses having spaces there between. Then, an internal parasitic effect of inductor and capacitor of the sensorless motor is detected. Thereafter, a zero-crossing point is detected through the motor coils is in a period when each of the driving transistor groups receives the pulses of the pulse-width modulation signal, but after the internal parasitic effect of inductor and capacitor ends.

Accordingly, when the method is performed, the zero-crossing point is detected after the interferences caused by the internal L-C effect disappear, so as to avoid the erroneous determination of the zero-crossing point and increase the precision of the determination of the zero-crossing point.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
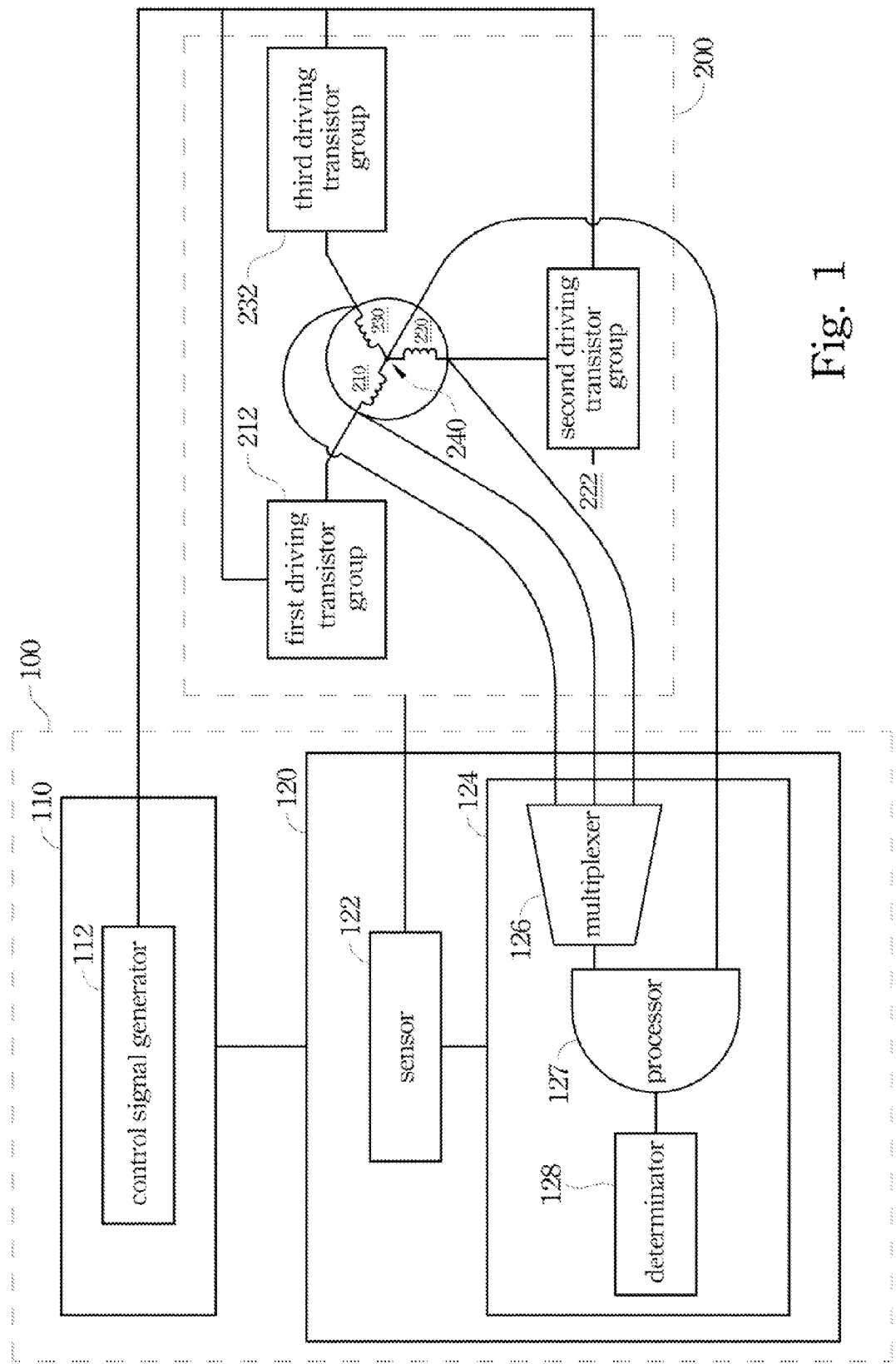
FIG. 1 is a functional block diagram showing a system for controlling a sensorless motor according to an embodiment of the present disclosure.

Reference will now be made in detail to the present preferred embodiments of the invention, examples of which are illustrated in the accompanying drawings. Wherever possible, the same reference numbers are used in the drawings and the description to refer to the same or like parts.

Referring to FIG. 1, FIG. 1 is a functional block diagram showing a system for controlling a sensorless motor according to an embodiment of the present disclosure. As shown in FIG. 1, the sensorless motor 200 includes at least three motor coils 210, 220, and 230. Those motor coils 210, 220, 230 are connected to a neutral point 240. The system 100 includes a motor driver 110 and a zero crossing detector 120.

In aspect of structure, the motor driver 110 is electrically connected to the sensorless motor 200. The zero crossing detector 120 is electrically connected to the sensorless motor 200. The motor driver 110 is electrically connected to the zero crossing detector 120.

In aspect of function, the motor driver 110 can drive the sensorless motor 200 to enable the voltage of each of the motor coils 210, 220, and 230 to enter a blanking period, when the value of the voltage of each of the motor coils is changed from negative to positive or from positive to negative. The zero crossing detector 120 can detect a zero-crossing point for the sensorless motor 200 at the time when the voltage of one of the motor coils enters the blanking period.

Accordingly, when the system 100 is used, the purpose for setting up a blanking period is to enable the motor coils to reserve a noiseless voltage, so as to help the detection of the zero-crossing point in the process for driving the sensorless motor 200.

In FIG. 1, the zero crossing detector 120 comprises a detector 124. The detector 124 comprises a multiplexer 126, a processor 127, and a determinator 128.

In aspect of structure, the three motor coils 210, 220, and 230 are electrically connected to the multiplexer 126. The multiplexer 126 and the neutral point 240 of the sensorless motor 200 are electrically connected to the processor 127 respectively. The processor 127 is electrically connected to the determinator 128.

In aspect of function, the multiplexer 126 can get the voltage of one of the motor coils 210, 220, and 230 from the motor coils 210, 220, and 230. The processor 127 can determine if a curve of a neutral voltage at the neutral point 240 crosses a curve of the voltage of one of the motor coils when the voltage of one of the motor coils is in the blanking period. The determinator 128 is used to determine the time point when the curve of the neutral voltage crosses the curve of the voltage of one of the motor coils as the time point to which the zero-crossing point corresponds.

Accordingly, when the system 100 is used, the zero-crossing point of counter electromotive force is detected, and determined as the time point for phase change of the sensorless motor 200.

Figure 2:
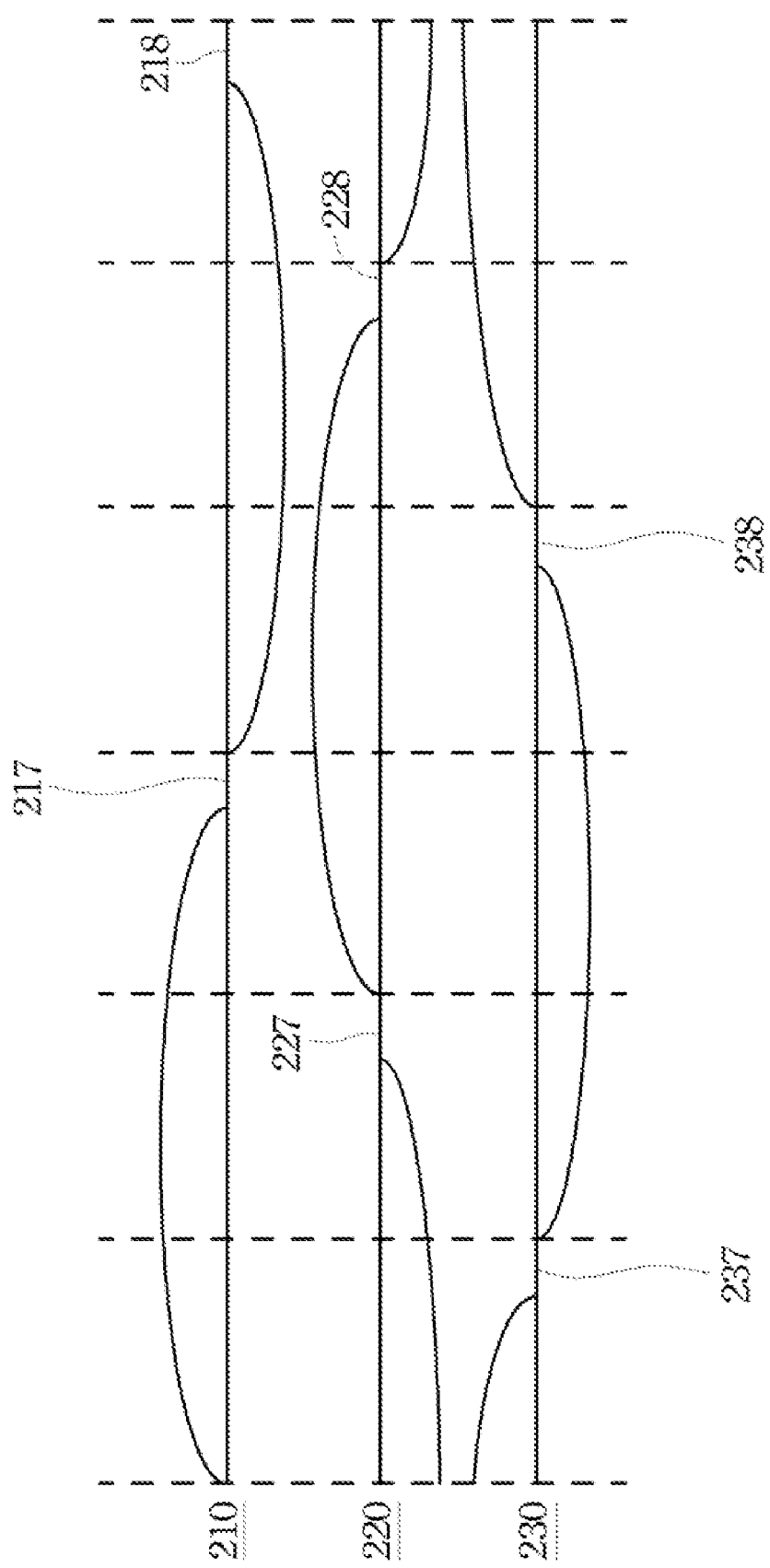
FIG. 2 is a waveform diagram showing the waveform of a voltage of the sensorless motor shown in FIG. 1.

Referring to FIG. 2, FIG. 2 is a waveform diagram showing the waveform of the voltage of the sensorless motor shown in FIG. 1. As shown in FIG. 2, when any of the three motor coils 210, 220, and 230 enters the blanking period, the voltage value thereof is constant.

In FIG. 2, the waveform of the voltage curve of the motor coil 210 is similar to a sine wave. When the voltage value of the motor coil 210 is changed from positive to negative, the voltage of the motor coil 210 undergoes a blanking period 217, and when the voltage value of the motor coil 210 is changed from negative to positive, the voltage of the motor coil 210 undergoes a blanking period 218. In the blanking period 217 and 218, the voltage value of the motor coil 210 may be, for example, zero. Similarly, the waveform of the voltage curve of the motor coil 220 is similar to a sine wave. When the voltage value of the motor coil 220 is changed from negative to positive, the voltage of the motor coil 220 undergoes a blanking period 227, and when the voltage value of the motor coil 220 is changed from positive to negative, the voltage of the motor coil 220 undergoes a blanking period 228. In the blanking period 227 and 228, the voltage value of the motor coil 220 may be, for example, zero. Similarly, the waveform of the voltage curve of the motor coil 220 is similar to a sine wave. When the voltage value of the motor coil 230 is changed from positive to negative, the voltage of the motor coil 230 undergoes a blanking period 237, and when the voltage value of the motor coil 230 is changed from negative to positive, the voltage of the motor coil 230 undergoes a blanking period 238. In the blanking period 237 and 238, the voltage value of the motor is coil 230 may be, for example, zero.

Refer to FIG. 1. The sensorless motor further includes at least three driving transistor groups 212, 222 and 232, which are respectively connected to the three motor coils 210, 220, 230. The motor driver 110 of the system 100 includes a control signal generator 112.

In aspect of structure, the first driving transistor group 212, the second driving transistor group 222, and the third driving transistor group 232 electrically connected to the control signal generator 112 respectively.

In aspect of function, the control signal generator 112 may generate a pulse-width modulation signal for a selected driving transistor group which is one of the driving transistor group 212, driving transistor group 222, and driving transistor group 232, so as to enable the sensorless motor 200 to work in accordance with the pulse-width modulation signal, wherein the pulse-width modulation signal comprises a plurality of pulses having spaces there between.

Accordingly, when the system 100 is used, the driving transistor group 212, driving transistor group 222, and driving transistor group 232 are controlled by the pulse-width modulation signal to enable the sensorless motor 200 to work.

In FIG. 1, in addition to the detector 124, zero crossing detector 120 further includes a sensor 122.

In aspect of structure, the sensor 122 is electrically connected to the detector 124. The detector 124 is electrically connected to the sensorless motor 200. The sensor is electrically connected to the sensorless motor 200.

In aspect of function, the sensor 122 can sense or detect internal parasitic effects of inductor and capacitor (internal L-C effects) of the sensorless motor 200. The detector 124 can start detecting the zero-crossing point in a period when the voltage of one of the motor coils 210, 220, and 230 enters the blanking period, and when each of the two driving transistor groups connected to the other two motor coils receives the pulse-width modulation signal, but after the internal parasitic effect of inductor and capacitor ends.

Accordingly, when the system 100 is used, the zero-crossing point is detected after the interferences caused by the internal L-C effects of the sensorless motor 200 disappear, so as to avoid the erroneous determination of the zero-crossing point and increase the precision of the determination of the zero-crossing point.

Figure 3:
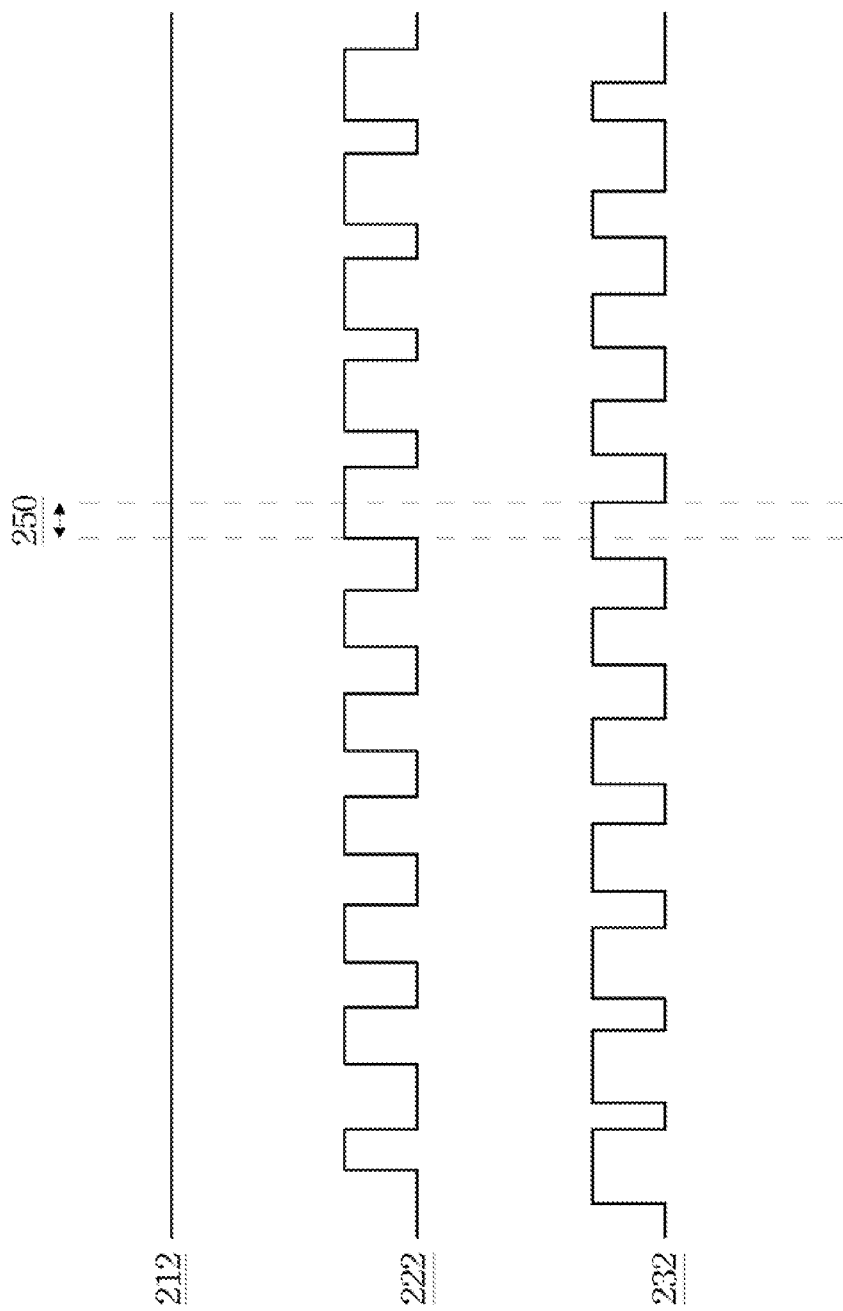
FIG. 3 is a time sequence diagram showing the time sequence of a to pulse-width modulation signal of the system shown in FIG. 1.

Refer to FIG. 3. FIG. 3 is a time sequence diagram showing the time sequence of a pulse-width modulation signal of the system shown in FIG. 1. As shown in FIG. 3, the system 100 enables the voltage of the first driving transistor group 212 to stay at a low level. This means the voltage of the motor coil 210 is in the blanking period. In addition, the system 100 detects the zero-crossing point in a period 250 when each of the two driving transistor groups 222 and 232 connected to the other two motor coils (i.e., motor coils 220 and 230) receives the pulse-width modulation signal, and after the inferences caused by the internal L-C effects disappear.

Figure 4:
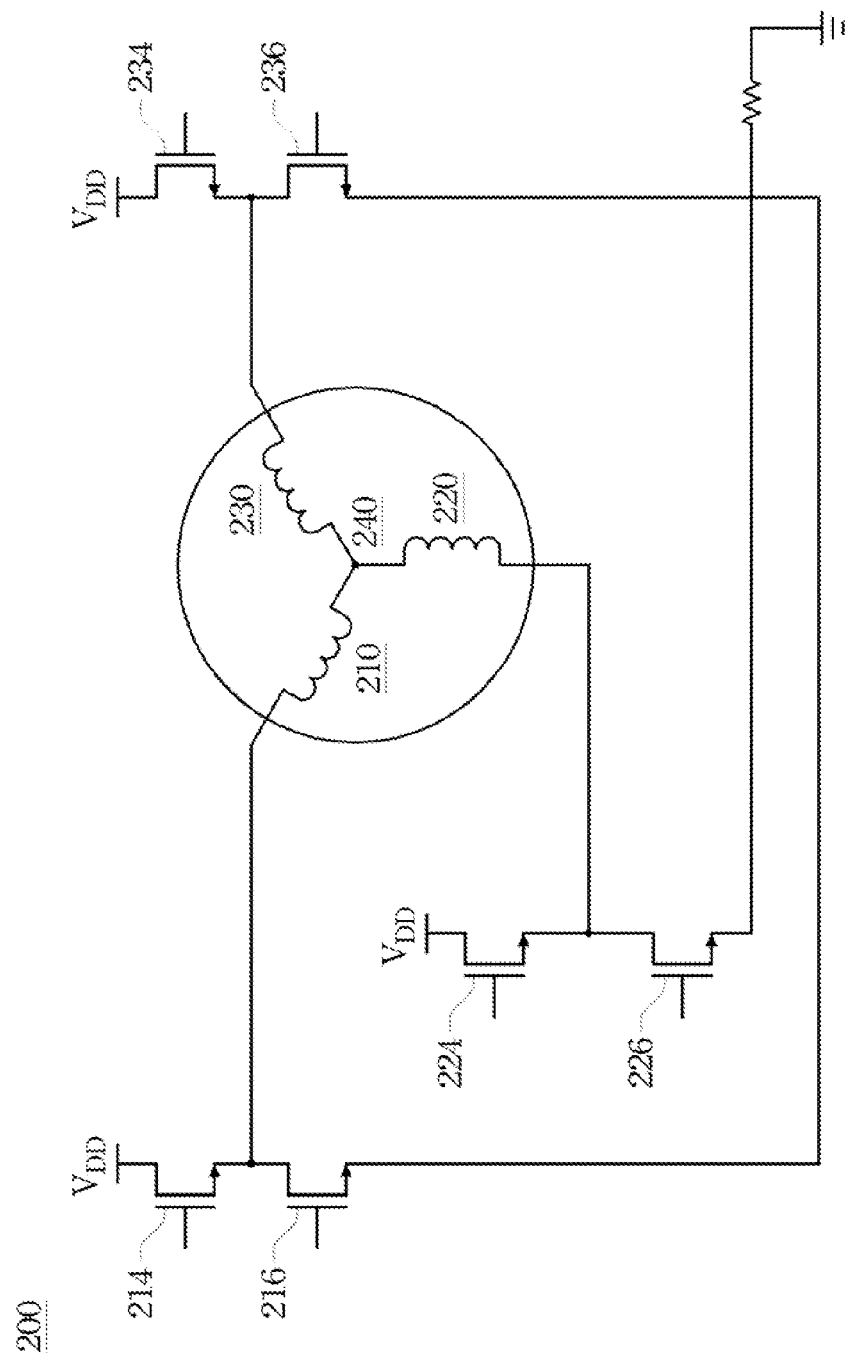
FIG. 4 is a circuit diagram of the sensorless motor shown in FIG. 1.

Refer to FIG. 4. FIG. 4 is a circuit diagram of the sensorless motor shown in FIG. 1. As shown in FIG. 4, the first driving transistor group connected to the motor coil 210 has a driving transistor 214 and a driving transistor 216. A point at which the driving transistors 214 and 216 are connected is electrically connected to the motor coil 210. Similarly, the second driving transistor group is connected to the motor coil 220 includes a driving transistor 224 and a driving transistor 226. A point at which the driving transistors 224 and 226 are connected is electrically connected to the motor coil 220. Similarly, the third driving transistor group connected to the motor coil 230 includes a driving transistor 234 and a driving transistor 236. A point at which the driving transistors 234 and 236 are connected is electrically connected to the motor coil 230. In addition, the driving transistors 214, 224, and 234 are connected to a positive voltage source $V_{DD}$, and the driving transistors 216, 226 and 236 are electrically connected to ground.

Figure 5:
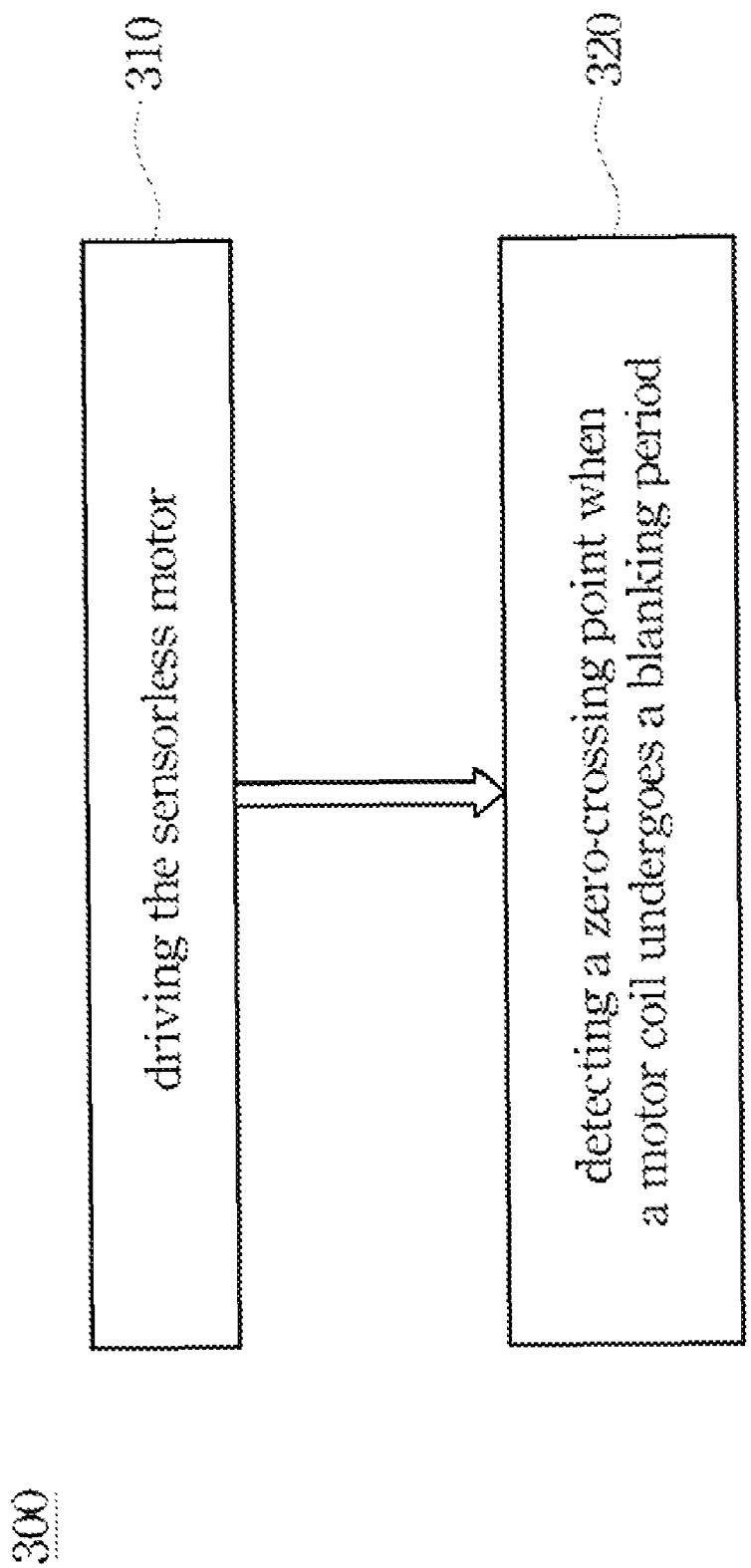
FIG. 5 is a flow chart showing a method for controlling a sensorless motor according to another embodiment of the present disclosure.

Refer to FIG. 5. FIG. 5 is a flow chart showing a method 300 for controlling a sensorless motor according to another embodiment of the present disclosure. The sensorless motor includes at least three motor coils connected to a neutral point. As shown in FIG. 5, the method 300 includes following steps 310 and 320. (It is understood that the sequence of the steps mentioned in this embodiment can be adjusted based on the real demand, and the steps can also be performed at the same time or partially performed at the same time, unless the steps are arranged with a specific sequence mentioned in this embodiment).

When the method 300 is performed, in Step 310 the sensorless motor is driven so as to enable the voltage of each of the three motor coils to enter a blanking period when the voltage value of the voltage is changed from negative to positive. In the step 320, a zero-crossing point is detected for the sensorless motor at the time point when the voltage of one of the motor coils enters the blanking period.

Accordingly, when the method 300 is performed, the purpose for setting up a blanking period in the process for driving the sensorless motor is to enable the motor coils to reserve a noiseless voltage, so as to help the detection of the zero-crossing point.

In the step 320, the voltage of one of the motor coils (i.e., motor coil 210) can be get from the motor coils, and it is determined that if the curve of a neutral voltage at the neutral point crosses the curve of the voltage of one of the motor coils (i.e., motor coil 210) when the voltage of one of the motor coils is in the blanking period. Then, the time point when the curve of the neutral voltage crosses the curve of the voltage of one of the motor coils (i.e., motor coil 210) is determined as the time point to which the zero-crossing point corresponds.

Accordingly, when the method 300 is performed, the zero-crossing point of the counter electromotive force is detected, and determined as the time point for phase change of the sensorless motor 200.

In practice, when any of the three motor coils enters the blanking period, the voltage value thereof is constant. For example, when any of the three motor coils enters the blanking period, the voltage value thereof is zero.

In another aspect, the sensorless motor for which the method 300 is adaptive may include at least three driving transistor groups respectively connected to the three motor coils. In the step 310, a pulse-width modulation signal is generated for each of the driving transistor groups selected, so as to enable the sensorless motor to work in accordance with the pulse-width modulation signal, wherein the pulse-width modulation signal includes a plurality of pulses having spaces there between.

Accordingly, when the method 300 is performed, the pulse-width modulation signal can be used to control the driving transistor group to enable the sensorless motor to work.

In the step 320, the internal L-C effects of the sensorless motor is detected. Then, a zero-crossing point is detected, in a period when the voltage of one of the motor coils enters the blanking period and each of the two driving transistor groups connected to the other two motor coils receives the pulse-width modulation signal, but after the internal parasitic effect of inductor and capacitor ends.

Accordingly, when the method 300 is performed, the zero-crossing point is detected after the interferences caused by the internal L-C effects disappear, so as to avoid the erroneous determination of the zero-crossing point and increase the precision of the determination of the zero-crossing point.

Figure 6:
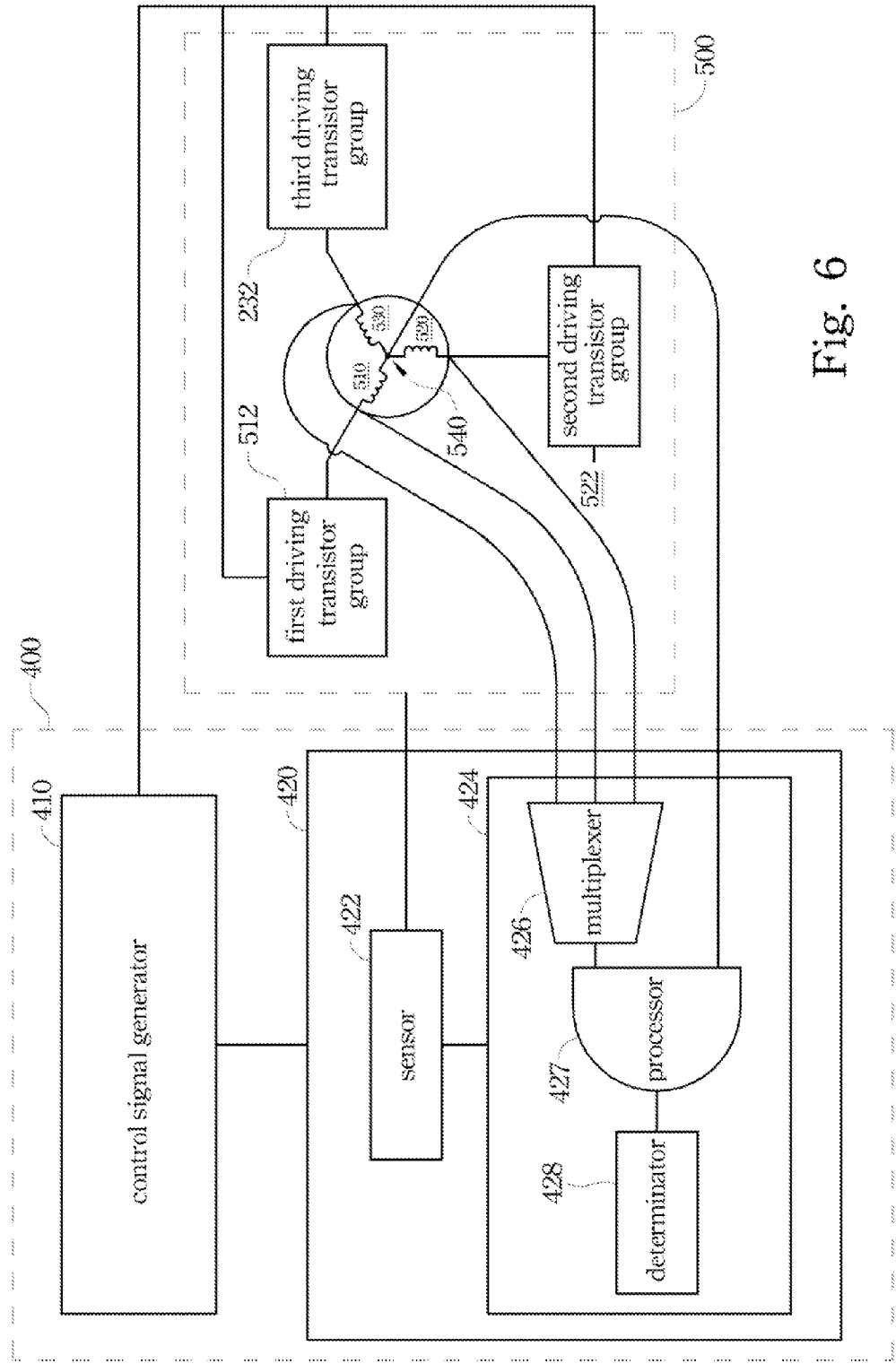
FIG. 6 is a functional block diagram showing a system for controlling a sensorless motor according to further another embodiment of the present disclosure.

Refer to FIG. 6. FIG. 6 is a functional block diagram showing a system for controlling a sensorless motor according to further another embodiment of the present disclosure. As shown in FIG. 6, the sensorless motor 500 includes at least three motor coils 510, 520, and 530, and at least three driving transistor groups 512, 522, and 532. Those motor coils 510, 520, and 530 are connected to a neutral point 540. The first driving transistor group 512, the second driving transistor group 522, and the third driving transistor group 532 are respectively connected to the three motor coils 510, 520 and 530. The system 400 includes a motor driver 410 and a zero crossing detector 420. The zero crossing detector 420 includes a sensor 422 and a detector 424.

In aspect of structure, the motor driver 410 is electrically connected to the sensorless motor 500. The zero crossing detector 420 is electrically connected to the sensorless motor 500. The motor driver 410 is electrically connected to the zero crossing detector 420. The sensor 422 is electrically connected to the detector 424. The detector 424 is electrically connected to the sensorless motor 500. The sensor 422 is electrically connected to the sensorless motor 500.

In aspect of function, the motor driver 410 can generate a pulse-width modulation signal for each of the driving transistor groups selected, so as to enable the sensorless motor 500 to work in accordance with the pulse-width modulation signal, wherein the pulse-width modulation signal includes a plurality of pulses having spaces there between. The sensor 422 can sense or detect internal L-C effects of the sensorless motor 500. The detector 424 can detect a zero-crossing point through the motor coils 510, 520, and 530 in a period when each of the driving transistor groups 512, 522, and 532 receives the pulses of the pulse-width modulation signal, but after the internal L-C effects end.

Accordingly, when the system 400 is used, the zero-crossing point is detected after the interferences caused by the internal L-C effects of the sensorless motor disappear, so as to avoid the erroneous determination of the zero-crossing point and increase the precision of the determination of the zero-crossing point.

In FIG. 6, the detector 424 includes a multiplexer 426, a processor 427, and a determinator 428.

In aspect of structure, the three motor coils 510, 520, and 530 are electrically connected to the multiplexer 426. The multiplexer 426 and the neutral point 540 of the sensorless motor 500 are electrically connected to the processor 427 respectively. The processor 427 is electrically connected to the determinator 428.

In aspect of function, the multiplexer 426 can get the voltage of one of the motor coils 510, 520, and 530 from the motor coils 510, 520, and 530. The processor 427 can determine if the curve of a neutral voltage at the neutral point 540 crosses the curve of the voltage of one of the motor coils, when the voltage of one of the motor coils is in the blanking period, and after the internal L-C effects ends. The determinator 428 determines the time point when the curve of the neutral voltage crosses the curve of the voltage of one of the motor coils as the time point to which the zero-crossing point corresponds.

Accordingly, when the system 400 is used, the zero-crossing point of counter electromotive force is detected, and determined as the time point for phase change of the sensorless motor 500.

Figure 7:
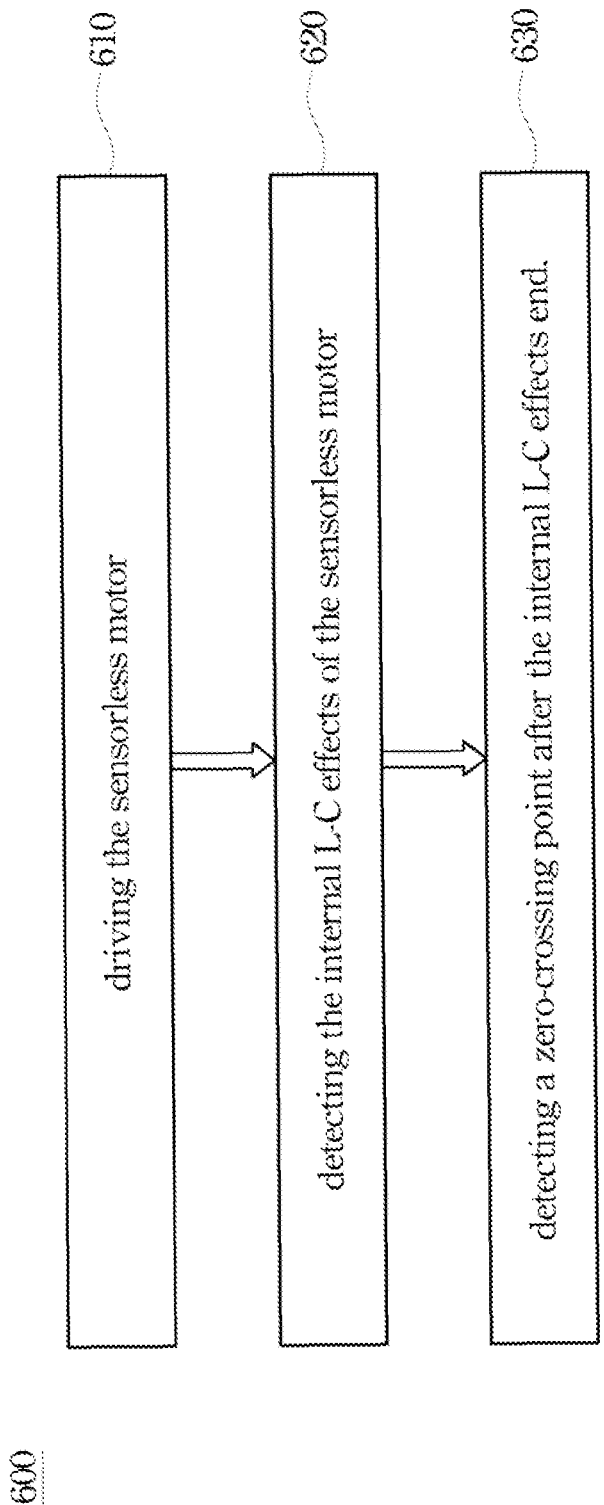
FIG. 7 is a flow chart showing a method for controlling a sensorless motor according to further another embodiment of the present disclosure.

Refer to FIG. 7. FIG. 7 is a flow chart showing a method 600 for controlling a sensorless motor according to further embodiment of the present disclosure. The sensorless motor includes at least three motor coils connected to a neutral point. As shown in FIG. 7, the method 600 includes the following steps 610, 620, and 630. (It is understood that the sequence of the steps mentioned in this embodiment can be adjusted based on the real demand, and the steps can also be performed at the same time or partially performed at the same time, unless the steps are arranged with a specific sequence mentioned in this embodiment).

When the method 600 is performed, in the step 610, a pulse-width modulation signal is generated for each of the driving transistor groups selected, so as to enable the sensorless motor to work in accordance with the pulse-width modulation signal, wherein the pulse-width modulation signal comprises a plurality of pulses having spaces there between. In the step 620, the internal L-C effects of the sensorless motor is detected. In the step, 630, a zero-crossing point is detected through the motor coils in a period when each of the driving transistor groups receives the pulses of the pulse-width modulation signal, but after the internal L-C effects end.

Accordingly, when the method 600 is used, the zero-crossing point is detected after the interferences caused by the internal L-C effects disappear, so as to avoid the erroneous determination of the zero-crossing point and increase the precision of the determination of the zero-crossing point.

In the step 630, the voltage of one of the motor coils can be obtained from the motor coils, and it is determined that if the curve of a neutral voltage at the neutral point crosses the curve of the voltage of one of the motor coils in a period when the voltage of one of the motor coils is in the blanking period, but after the internal L-C effects end. Then, the time point when the curve of the neutral voltage at the neutral point crosses the curve of the voltage of one of the motor coils is determined as the time point to which the zero-crossing point corresponds.

Accordingly, when the method 600 is performed, the zero-crossing point of counter electromotive force is detected, and determined as the time point for phase-change of the sensorless motor 500.

It will be apparent to those skilled in the art that various modifications and variations can be made to the structure of the present invention without departing from the scope or spirit of the invention. In view of the foregoing, it is is intended that the present invention cover modifications and variations of this invention provided they fall within the scope of the following claims and their equivalents.

What is claimed is:

1. A system for controlling a sensorless motor, wherein the sensorless motor comprises at least three motor coils connected to a neutral point and at least three driving transistor groups respectively connected to the motor coils, and the system comprises:

a motor driver, used to drive the sensorless motor to enable a voltage of each of the motor coils to enter a blanking period when the value of the voltage of each of the motor coils is changed from negative to positive or from positive to negative, wherein the motor driver comprises:

a control signal generator used to generate a pulse-width modulation signal for each of the driving transistor groups selected, so as to enable the sensorless motor to work in accordance with the pulse-width modulation signal, wherein the pulse-width modulation signal comprises a plurality of pulses having spaces there between; and a zero-crossing detector, used to detect a zero-crossing point for the sensorless motor at the time when the voltage of one of the motor coils enters the blanking period wherein the zero-crossing detector comprises:

a sensor, used to detect an internal parasitic effect of inductor and capacitor (internal L-C effect) of the sensorless motor; and a detector, used to start detecting the zero-crossing point in a period when the voltage of one of the motor coils enters the blanking period, and each of the two driving transistor groups connected to the other two motor coils receives the pulse-width modulation signal, but after the internal parasitic effect of inductor and capacitor ends.

2. The system as claimed in claim 1, wherein the zero crossing detector comprises:

a multiplexer, used to get the voltage of one of the motor coils from the motor coils;

a processor, used to determine if a curve of a neutral voltage at the neutral point crosses a curve of the voltage of one of the motor coils when the voltage of one of the motor coils is in the blanking period; and a determinator, used to determine the time point when the curve of the neutral voltage crosses the curve of the voltage of one of the motor coils as the time point to which the zero-crossing point corresponds.

3. The system as claimed in claim 1, wherein the voltage value of any of the motor coils is constant, when it enters the blanking period.

4. A method for controlling a sensorless motor, wherein the sensorless motor comprises at: least three motor coils connected to a neutral point and at least three transistor driver groups respectively connected to the motor coil, and the method comprises:

driving the sensorless motor to enable the voltage of each of the motor coils to enter a blanking period, when the value of the voltage of each of the motor coils is changed from negative to positive or from positive to negative wherein the step for driving sensorless motor of the method comprises:
    generating a pulse-width modulation signal for each of the driving transistor groups selected, so as to enable the sensorless motor to work in accordance with the pulse-width modulation signal, wherein the pulse-width modulation signal comprises a plurality of pulses having spaces there between; and
detecting a zero-crossing point for the sensorless motor at the time when the voltage of one of the motor coils enters the blanking period, wherein the step for detecting the zero-crossing point for the sensorless motor at the time when the voltage of one of the motor coils enters the blanking period comprises:
    detecting an internal parasitic effect of inductor and capacitor of sensorless motor; and
    detecting the zero-crossing point in a period when the voltage of one of the motor coils enters the blanking period, and each of the two driving transistor groups connected to the other two motor coils receives the pulse-width modulation signal, but after the internal parasitic effect of inductor and capacitor ends.

5. The method as claimed in claim 4, wherein the step for detecting the zero-crossing point at the time when the voltage of one of the motor coils enters the blanking period comprises:
    getting a voltage of one of the motor coils from the motor coils;
    determining if a curve of a neutral voltage at the neutral point crosses a curve of the voltage of one of the motor coils, when the voltage of one of the motor coils is in the blanking period; and
    determining the time point when the curve of the neutral voltage crosses the curve of the voltage of one of the motor coils as the time point to which the zero-crossing point corresponds.

6. The method as claimed in claim 4, wherein the voltage value of any of the motor coils is constant, when it enters the blanking period.

7. A system for controlling a sensorless motor, wherein the sensorless motor comprises at least three motor coils connected to a neutral point and at least three driving transistor groups respectively connected to the motor coils, and the system comprises:
    a motor driver, used to generate a pulse-width modulation signal for each of the driving transistor groups selected, so as to enable the sensorless motor to work in accordance with the pulse-width modulation signal, wherein the pulse-width modulation signal comprises a plurality of pulses having spaces there between; and
    a zero-crossing detector comprising:
        a sensor used to detect an internal parasitic effect of inductor and capacitor of the sensorless motor; and
        a detector, used to detect a zero-crossing point through the motor coils in a period when each of the driving transistor groups receives the pulses of the pulse-width modulation signal, but after the internal parasitic effect of inductor and capacitor ends.

8. The system as claimed in claim 7, wherein the detector comprises:
    a multiplexer used to get the voltage of one of the motor coils from the motor coils;
    a processor, used to determine if the curve of a neutral voltage at the neutral point crosses the curve of the voltage of one of the motor coils in a period when the voltage of one of the motor coils is in the blanking period, but after the internal parasitic effect of inductor and capacitor ends; and
    a determinator used to determine the time point when the curve of the neutral voltage crosses the curve of the voltage of one of the motor coils as the time point to which the zero-crossing point corresponds.

9. A method for controlling a sensorless motor, wherein the sensorless motor comprises at least three motor coils connected to a neutral point and at least three driving transistor groups respectively connected to the motor coils, and the method comprises:
    generating a pulse-width modulation signal for each of the driving transistor groups selected, so as to enable the sensorless motor to work in accordance with the pulse-width modulation signal, wherein the pulse-width modulation signal comprises a plurality of pulses having spaces there between;
    detecting an internal parasitic effect of inductor and capacitor of the sensorless motor; and
    detecting a zero-crossing point through the motor coils in a period when each of the driving transistor groups receives the pulses of the pulse-width modulation signal, but after the internal parasitic effect of inductor and capacitor ends.

10. The method as claimed in claim 9, wherein the step for detecting the zero-crossing point comprises:
    getting the voltage of one of the motor coils from the motor coils;
    determining if the curve of a neutral voltage at the neutral point crosses the curve of the voltage of one of the motor coils in a period when the voltage of one of the motor coils is in the blanking period, but after the internal parasitic effect of inductor and capacitor ends; and
    determining the time point when the curve of the neutral voltage at the neutral point crosses the curve of the voltage of one of the motor coils as the time point to which the zero-crossing point corresponds.

* * * * *